United States Patent [19]

Langenhorst

[11] Patent Number: 4,669,343
[45] Date of Patent: Jun. 2, 1987

[54] CORNER JOINT CONSTRUCTION FOR MITERED JAMBS OF A FRAME

[75] Inventor: Christoph Langenhorst, Bad Sassendorf, Fed. Rep. of Germany

[73] Assignee: Walpat AG, Switzerland

[21] Appl. No.: 690,118

[22] Filed: Jan. 10, 1985

[30] Foreign Application Priority Data

Jan. 11, 1984 [DE] Fed. Rep. of Germany ....... 3400751

[51] Int. Cl.$^4$ .............................................. E06B 1/04
[52] U.S. Cl. ...................................... 52/211; 52/656; 403/382; 403/364
[58] Field of Search .................... 52/656, 211, 212; 403/382, 364

[56] References Cited

U.S. PATENT DOCUMENTS

| | | | |
|---|---|---|---|
| 9,552 | 1/1853 | Bell | 403/364 |
| 389,684 | 9/1888 | Beach | 403/364 |
| 2,916,112 | 12/1959 | Kiehl | 52/211 X |
| 4,550,542 | 11/1985 | La See | 52/656 |

FOREIGN PATENT DOCUMENTS 2107273 8/1972 Fed. Rep. of Germany .

Primary Examiner—Carl D. Friedman
Attorney, Agent, or Firm—McGlew and Tuttle

[57] ABSTRACT

A corner joint between mitered jambs of a door frame, with claws provided in the miter region of the jamb ends. The claws are designed as tongues cut out of the jambs. The tongues are provided with abutment elements which engage behind the respective adjacent jambs. Further, the tongues and their abutment elements are offset relative to each other and so dimensioned that in assembled state, they engage and snugly fit between the tongues of the other jamb. The manufacture and assemblage of the frame jambs is thereby considerably simplified.

3 Claims, 7 Drawing Figures

FIG. 5
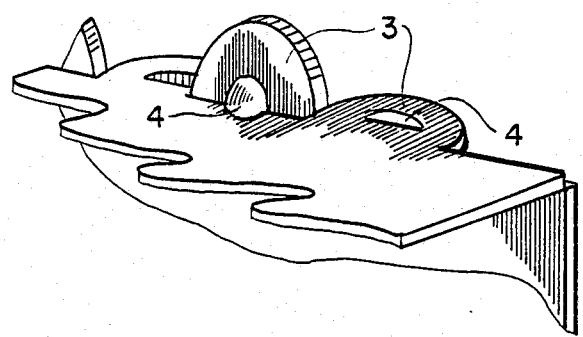
FIG. 7
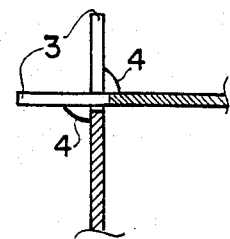
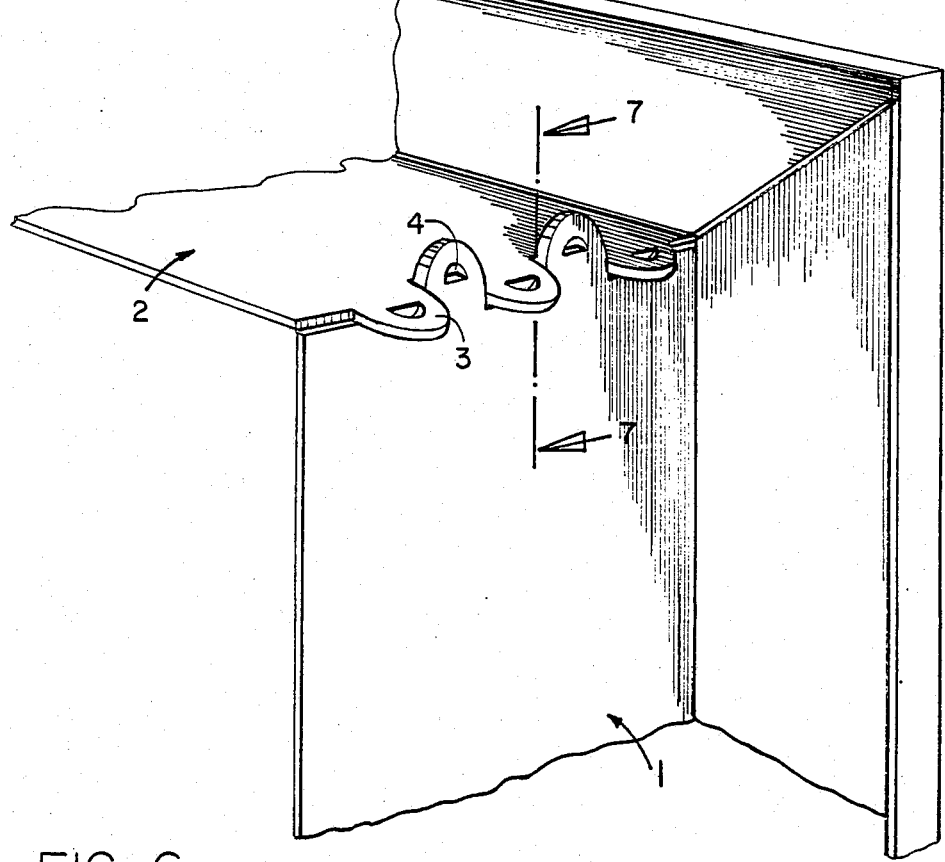
FIG. 6

4,669,343

CORNER JOINT CONSTRUCTION FOR MITERED JAMBS OF A FRAME

FIELD AND BACKGROUND OF THE INVENTION

This invention relates in general to corner joint constructions and in particular to a new and useful corner joint of a mitered jamb of a door frame in which the individual elements forming a corner include claws which interengage.

In a prior art corner joint of this kind, disengageable claw locks are provided, with the claws for engaging the upper horizontal door frame member projecting into the miter region from clamping plates which are provided on the two vertical jambs of the frame. The interengageable claws push the frame parts apart.

To obtain an additional connection, some snap elements are secured to the backside of the U-section frame. A relatively large number of individual parts is thus needed for the connections (German OS No. 21 07 273).

In another prior art corner joint, the frame jambs are provided on their outside with spring legs projecting into the miter region. These spring legs are designed as semicircular engaging heads which are bent toward the inside of the jamb close behind the jamb end of the respective frame jamb. The engaging head is followed by an outwardly extending portion having an engaging cam and a cross web. The spring legs are provided on the jamb ends in mutually offset positions and their dimensions are such that engaging cams of one of the spring legs engage behind the cross web of the other spring leg (German OS No. 27 01 208). This connection again requires individual parts.

Either of these prior art claws and engaging locks has the particular disadvantage that the individual connecting elements must be separately manufactured and then welded to the frame jambs in exact aligned positions. This is expensive.

SUMMARY OF THE INVENTION

The invention is directed to a corner joint insuring that the frame jambs can be assembled without using additional connecting elements in mitered areas, and extremely simplifying the manufacture of the jambs.

In accordance with the invention a corner joint of mitered jambs of a frame particularly a door frame comprises a pair of interengageable jamb members of a frame each of which have a mitered edge having claws which are provided on the jamb end of the frame jambs to be connected to each other and project into the miter region. The claws comprise tongues which are cut out of the associated frame jambs and extend in a plane of the frame such that the tongues which have abutment elements engage respective adjacent frame jambs. The tongues with the associated abutment elements are offset relative to each other and the dimensions are such that with the frame jambs assembled, the tongues of one of the frame jambs engage with a snug fit between the tongues of the other frame jambs.

The construction forms a firm frame jamb joint extending at right angles. In consequence, the frame or the frame jambs along with the connecting elements needed for establishing the corner joint, can be cut out and formed of a single piece, such as a steel or aluminum sheet. The tongues provided for the connection and their abutment elements may again be cut and formed in the same stamping operation, so that neither additional individual parts nor subsequent welding are needed for making an inventive corner joint during an assembly and setting up of a frame. Not only the manufacture of the single-piece frame jambs, but also their assemblage is particularly simple, since only the tongues of the jambs to be connected are to be interengaged with each other. After the jambs are brought into positions to form right angles with each other, a satisfactory connection in the miter is established requiring no subsequent work. Due to the shape of the tongues and abutment elements, a clamping tension is produced preventing a mutual displacement of the jambs and rather ensuring their position relative to each other. The manufacture and assemblage thus become particularly simple and purposeful, without additional connecting means. These are the substantial advantages of the invention.

There are still other important features, however. For example, the tongues may be designed, in accordance with the invention, as at least semicircular portions, even with recesses beyond the semicircular shape in the area adjacent the jamb, so that the interengagement of the tongues during the assemblage is facilitated. It is further provided that the abutment elements formed by corrugations made in the tongues by stamping, so that in this direction, the manufacture is further simplified, since the tongues and abutment elements can be formed with a follow-on tool.

Accordingly, it is an object of the invention to provide an improved frame construction which includes jamb members which have interengaging tongues.

A further object of the invention is to provide a corner joint of a mitered jamb of a frame which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 5 is a top perspective view of the two jam frames;

FIG. 6 is a view similar to FIG. 5 taken from the opposite side; and

FIG. 7 is a section taken along the line 7—7 of FIG. 6.

DESCRIPTION OF THE PREFERRED EMBODIMENT

Figure 1:
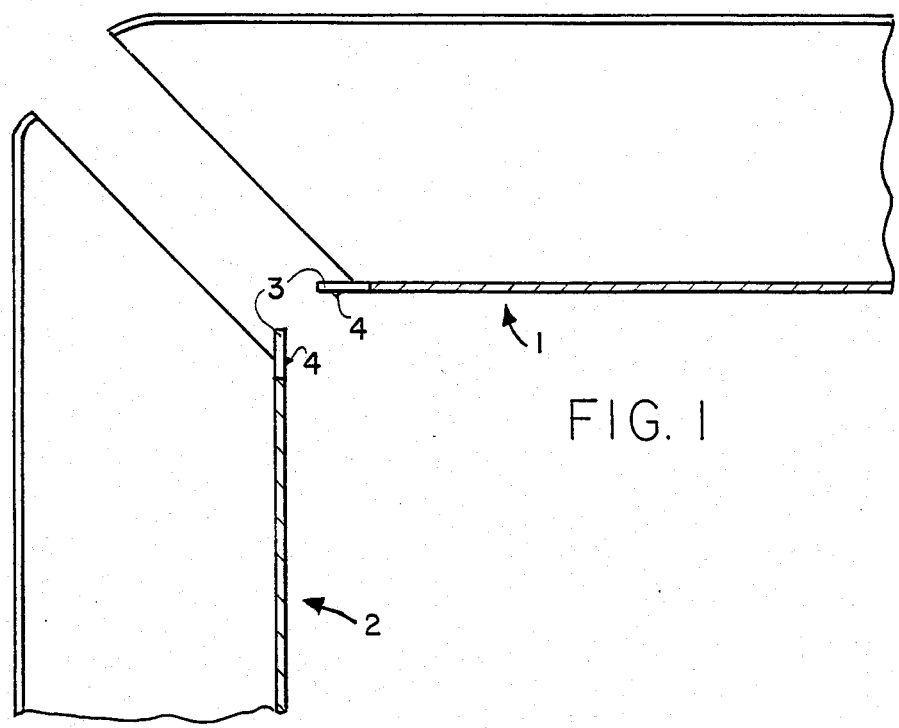
FIG. 1 is a sectional view of an inventive cornter joint of two frame jambs shown before the connection.
Figure 2:
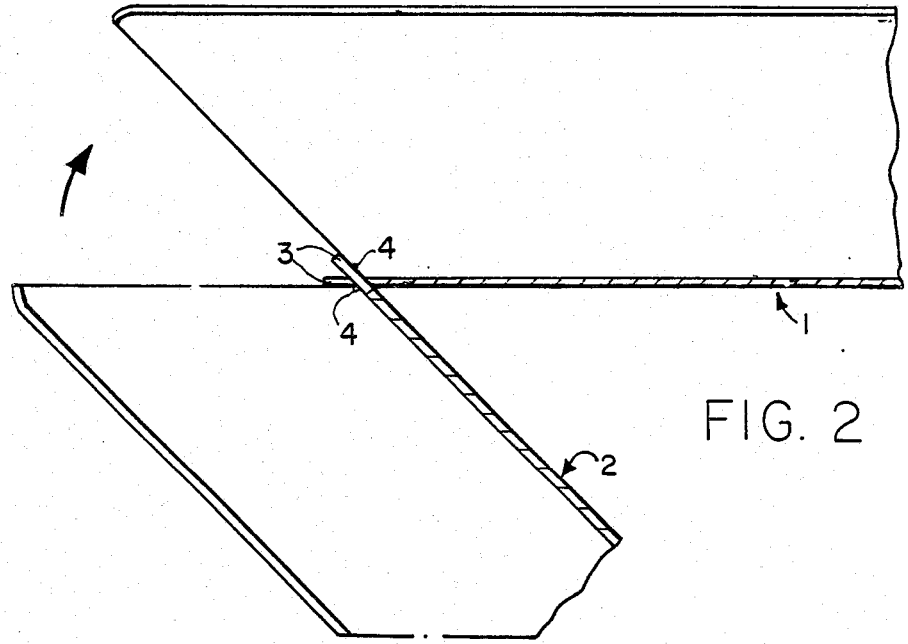
FIG. 2 is a view corresponding to FIG. 1 showing the jambs in adjacent position, before they are turned into the assembled position.
Figure 3:
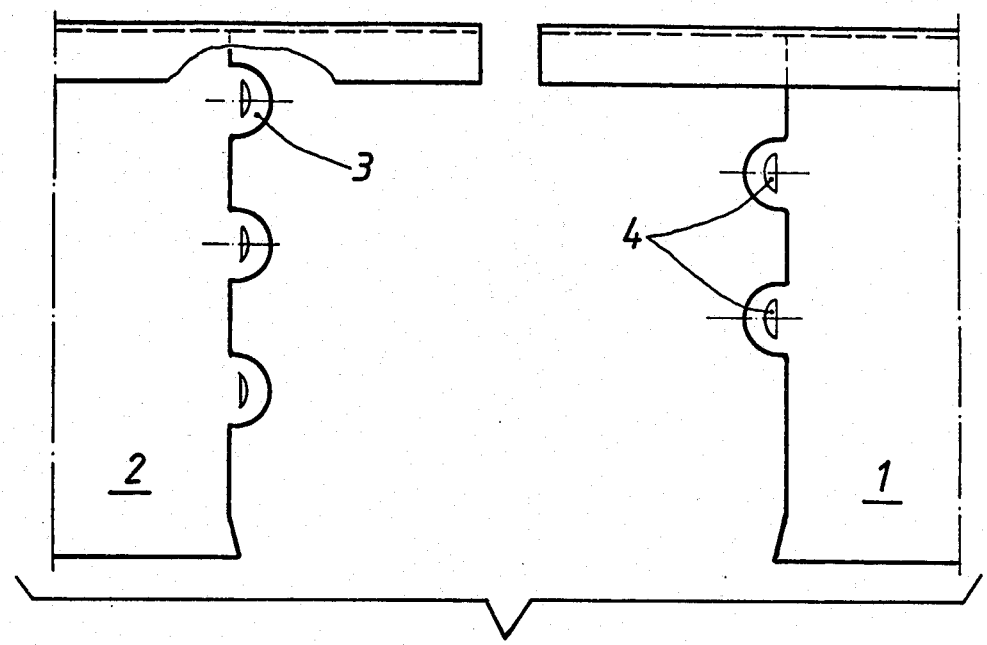
FIG. 3 is a top plan view of the two frame jambs to be connected to each other, in horizontal position.
Figure 4:
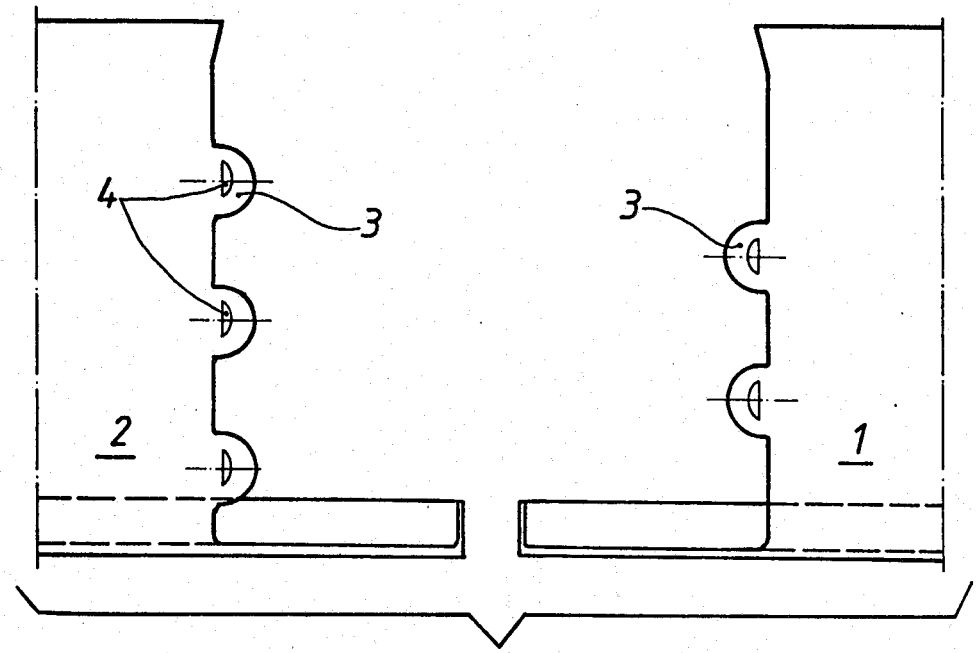
FIG. 4 is a bottom plan view corresponding to FIG. 3.

Referring to the drawings in particular the invention embodied therein comprises a corner joint of a miter jamb of a frame made up of two frame jambs 1 and 2 which are joined together in a miter joint to form a door frame.

The figures show a corner joint of mitered frame jambs 1,2 particularly two jambs each disposed in a separate plane and at substantially right angles to each other, with the jamb ends being provided on their outside with claws projecting into the miter region and beyond the edge of the adjacent jamb. By outside of the jamb, the side facing the masonry is understood. The claws are designed as tongues 3 which are cut out of frame jambs 1,2 and extend in the plane of the jamb. Tongues 3 are provided with abutment elements 4 which engage outside behind the respective adjacent frame jambs 1, 2 to be connected to each other. It is further provided that tongues 3 and their abutments 4 are offset relative to each other and so dimensioned that with the frame jambs 1, 2 assembled, tongues 3a of jamb 1 engage with a snug fit between tongues 3b of the other jamb 2, and that upon bringing the jambs 1,2 into a position at right angles, a clamping tension is produced ensuring a satisfactory joint between the jambs. In this position, jambs 1,2 apply by their ends against the abutment elements 4 of the respective adjacent jamb. The tongues 3 are designed as at least semicircular tongues and they may be recessed in the transition zone to the jamb 1, 2 beyond the semicircular shape. Abutment elements 4 are formed by currugations which are stamped into the tongues.

While a specific embodiment of the invention has been shown and described in detail to illustrate the application of the principles of the invention, it will be understood that the invention may be embodied otherwise without departing from such principles.

What is claimed is:

1. A corner joint of a mitered jamb of a frame, paticularly a door frame, comprising a pair of interengageable frame jambs each disposed in a separate plane and having a miter edge abutting the other, a plurality of claws provided on each jamb projecting outwardly of each associated frame jamb edge on the exterior thereof and beyond the edge of the adjacent jamb, said claws comprising tongues which are cut out of the associated frame jamb and extend in the plane of the associated frame jamb, said tongues having an abutment element projecting outwardly therefrom which engage over the exterior surface of the respective adjacent frame jamb, said tongues and their abutment elements of said jambs being offset relative to each other and their dimensions being such that the tongues of one of said frame jambs engage between the tongues of the adjacent frame jamb.

2. A corner joint according to claim 1, wherein said tongues are dimensioned such that they interfit with a snug fit.

3. A corner joint according to claim 1, wherein said tongues are simicircular and are formed with an exterior surface having a recess therein.

* * * * *